United States Patent
Matsuhashi et al.

(10) Patent No.: US 8,397,526 B2
(45) Date of Patent: Mar. 19, 2013

(54) CONTROLLER AND CONTROL METHOD FOR REFRIGERATING SYSTEM

(75) Inventors: Takayuki Matsuhashi, Ora-gun (JP); Tsuyoshi Kawaai, Uji (JP); Ken Aoki, Ashikaga (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 763 days.

(21) Appl. No.: 12/329,721

(22) Filed: Dec. 8, 2008

(65) Prior Publication Data

US 2009/0145144 A1    Jun. 11, 2009

(30) Foreign Application Priority Data

Dec. 7, 2007  (JP) .................................. 2007-316596

(51) Int. Cl.
*F25D 21/02*  (2006.01)
*F25D 21/06*  (2006.01)

(52) U.S. Cl. ................ 62/151; 62/155; 62/199; 62/200; 62/246; 62/272

(58) Field of Classification Search .................... 62/151, 62/155, 199, 200, 246, 272
See application file for complete search history.

(56) References Cited

U.S. PATENT DOCUMENTS

| | | | | |
|---|---|---|---|---|
| 3,905,202 A | * | 9/1975 | Taft et al. ........................ | 62/152 |
| 4,151,722 A | * | 5/1979 | Willitts et al. ................... | 62/155 |
| 5,108,269 A | * | 4/1992 | Glanvall ......................... | 417/310 |
| 5,138,843 A | * | 8/1992 | Tamayama et al. .............. | 62/82 |
| 6,629,422 B2 | * | 10/2003 | Wellman ......................... | 62/155 |
| 2005/0189493 A1 | * | 9/2005 | Bagley et al. .................. | 250/341.8 |

FOREIGN PATENT DOCUMENTS

| | | |
|---|---|---|
| JP | 59-185955 A | 10/1984 |
| JP | 04-369354 A | 12/1992 |
| JP | 05-071822 A | 3/1993 |
| JP | 10-238919 A | 9/1998 |
| JP | 2002-243349 A | 8/2002 |
| JP | 2003-194451 A | 7/2003 |
| JP | 2004-257666 | 9/2004 |

OTHER PUBLICATIONS

Japanese Office Action dated Apr. 17, 2012, issued in corresponding Japanese Patent Application No. 2007-316596, (English translation, 6 pages in total).

Japanese Office Action dated Oct. 16, 2012, issued in corresponding Japanese Patent Application No. 2007-316596, (English translation, 7 pages).

* cited by examiner

*Primary Examiner* — Cheryl J Tyler
*Assistant Examiner* — Jonathan Bradford
(74) *Attorney, Agent, or Firm* — Westerman, Hattori, Daniels & Adrian, LLP

(57) ABSTRACT

In a controller for a refrigerating system including refrigerating machines and showcases, a showcase that is about to execute a defrost operation is detected on the basis of a defrost operation indicating information. When the controller receives a notification indicating start of the defrost operation from the showcase concerned or on the basis of a comparison result between a pre-stored defrost-operation start time and the present time, at least one of the refrigerating machines is instructed to reduce the output power thereof. When the showcase finishes the defrost operation, the at least one of the refrigerating machines is instructed to increase the output power thereof so that the output power of the refrigerating machine is set to stationary output power.

7 Claims, 5 Drawing Sheets

F I G. 5
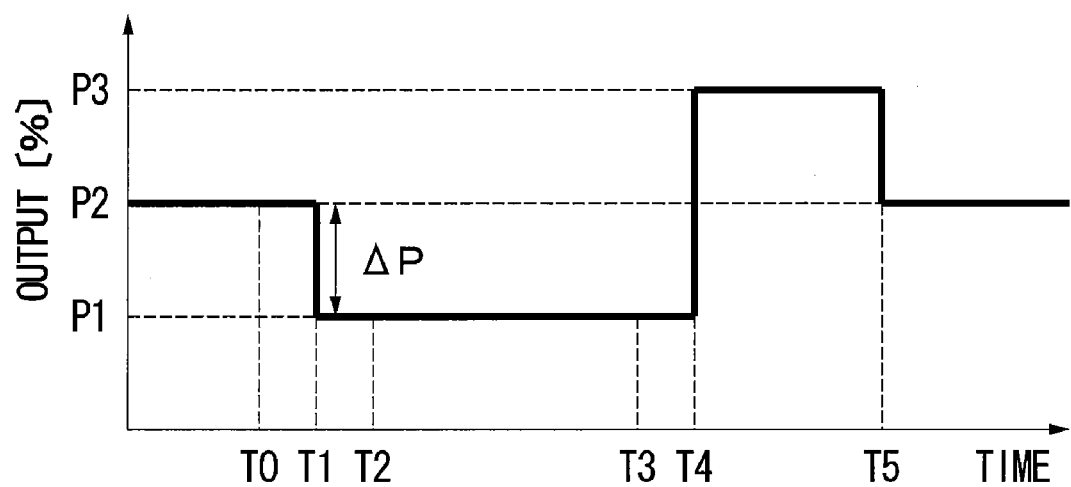

CONTROLLER AND CONTROL METHOD FOR REFRIGERATING SYSTEM

INCORPORATION BY REFERENCE

The present application claims priority under 35 U.S.C. §119 to Japanese Patent Application No. 2007-316596 filed on Dec. 7, 2007. The content of the application is incorporated herein by reference in its entirety.

BACKGROUND OF THE INVENTION

1. Field of the Invention

The present invention relates to a controller and a control method for a refrigerating system.

2. Description of the Related Art

JP-A-2004-257666 discloses a technique of a refrigerating system having plural showcases, plural refrigerating machines and control units for controlling the plural showcases and the refrigerating machines. In this refrigerating system, when a defrost operation of removing frost adhering to a heat exchanger of a showcase to be defrosted is executed, under the control of each control unit provided to a defrost target showcase (or the same type (i.e., low-temperature type or high-temperature type) of defrost target showcases), circulation of refrigerant through the defrost target showcase is stopped to increase the temperature of the heat exchanger and thus defrost the heat exchanger concerned, and then the inside temperature of the defrost target showcase is cooled to a set temperature. Accordingly, when the defrost operation as described above is executed under the control of the individual control unit provided to the defrost target showcase, the circulation amount of refrigerant flowing through the refrigerant circuit of the refrigerating system rapidly varies and thus the load imposed on the refrigerating machines rapidly varies, so that the operation efficiency of the refrigerating system is lowered.

SUMMARY OF THE INVENTION

The present invention has been implemented in view of the foregoing situation, and has an object to provide a controller and a control method that can efficiently execute a defrost operation in a refrigerating system.

In order to attain the above object, according to an aspect of the present invention, a controller for a refrigerating system including at least refrigerating machines and at least one showcase connected to the refrigerating machine through a refrigerant pipe, comprises: a defrost showcase detecting unit for detecting, on the basis of a defrost operation indicating information, a showcase that is about to execute a defrost operation; an output-power decrease instructing unit for instructing at least one of the refrigerating machines to reduce the output power of the at least one refrigerating machine to a value lower than stationary output power of the at least one refrigerating machine concerned when the showcase concerned executes the defrost operation; and an output-power increase instruction unit for instructing the at least one refrigerating machine to increase the output power of the at least one refrigerating machine to a value higher than the stationary output power of the at least one refrigerating machine when the defrost operation is finished.

The above controller may further comprise a detecting unit for detecting as the defrost operation indicating information a notification that is transmitted from the showcase concerned when the showcase concerned is about to execute the defrost operation.

The above controller may further comprise a storage unit for storing a defrost operation start time of the showcase concerned, a comparing unit for comparing the defrost operation start time stored in the storage unit with present time, and a step of instructing the at least one refrigerating machine to increase the output power thereof when the defrost operation start time is coincident with the present time.

In the above controller, the output-power increase instruction unit may reduce the output power of the at least one refrigerating machine to the stationary state when the inside temperature of the showcase concerned is restored to a neighborhood of set temperature after the output power of the at least one refrigerating machine is increased.

The above controller may further comprise a storage unit for pre-storing a decrease amount of the output power of the at least one refrigerating machine which is measured every refrigerating machine, and the output-power decrease instructing unit instructs the at least one refrigerating machine to reduce the output power thereof on the basis of the decrease amount of the output power pre-stored in the storage unit when the defrost operation is started.

In the above controller, when plural showcases start the defrost operation in synchronization with one another, the output-power increase instructing unit instructs the at least one refrigerating machine to stepwise increase the output power thereof in accordance with the number of showcases in which the defrosting operation has been finished.

According to a second aspect of the present invention, a control method for a refrigerating system including at least refrigerating machines and at least one showcase connected to the refrigerating machine through a refrigerant pipe, comprises: a defrost showcase detecting step for detecting, on the basis of a defrost operation indicating information, a showcase that is about to execute a defrost operation; an output-power decrease instructing step for instructing at least one of the refrigerating machines to reduce the output power of the at least one refrigerating machine when the showcase concerned executes the defrost operation; and an output-power increase instruction step for instructing the at least one refrigerating machine to increase the output power of the at least one refrigerating machine when the showcase concerned finishes the defrost operation.

The above control method may further comprise a detecting step for detecting as the defrost operation indicating information a notification that is transmitted from the showcase concerned when the showcase concerned is about to execute the defrost operation.

The above control method may further comprise a storage step for storing a defrost operation start time of the showcase concerned, a comparing step for comparing the defrost operation start time stored in the storage unit with present time and a instructing step of instructing the at least one refrigerating machine to increase the output power thereof when the defrost operation start time is coincident with the present time.

According to the controller and the control method for the refrigerating system of the present invention, when the defrost operation is started, the output power of the refrigerating machine(s) is reduced, and when the defrost operation is finished, the output power of the refrigerating machine(s) is increased. Accordingly, the defrost operation of the refrigerating machine(s) can be efficiently performed.

Furthermore, when the output power of the refrigerating machine is increased at the end time of the defrost operation and then the inside temperature of the showcase is restored to a neighborhood of the set temperature, the output power of the refrigerating machine is reduced till the stationary state.

Accordingly, when the defrost operation is finished and the inside temperature of the showcase approaches to the set temperature, the output power of the refrigerating machine can be rapidly restored to the stationary state, whereby power consumption can be suppressed.

According to the present invention, the output power of the refrigerating machine when the defrost operation is started is reduced on the basis of the storage value. Therefore, the control can be performed on the basis of the stored actual measurement value, and thus the power consumption can be suppressed by the optimum control.

Furthermore, according to the present invention, the output power of the refrigerating machine is increased in accordance with the number of showcases in which the defrost operation is finished. Therefore, even when the required time of the defrost operation is different every showcase, the output power of the refrigerating machine can be stepwise increased, whereby the optimum control can be performed and the power consumption can be suppressed.

BRIEF DESCRIPTION OF THE DRAWINGS

FIG. 5 is a diagram showing time-variation of the output of a refrigerating machine of the refrigerating system shown in FIG. 1.

DETAILED DESCRIPTION OF THE PREFERRED EMBODIMENTS

Preferred embodiments according to the present invention will be described hereunder with reference to the accompanying drawings.

(A) Description of Embodiments

Figure 1:
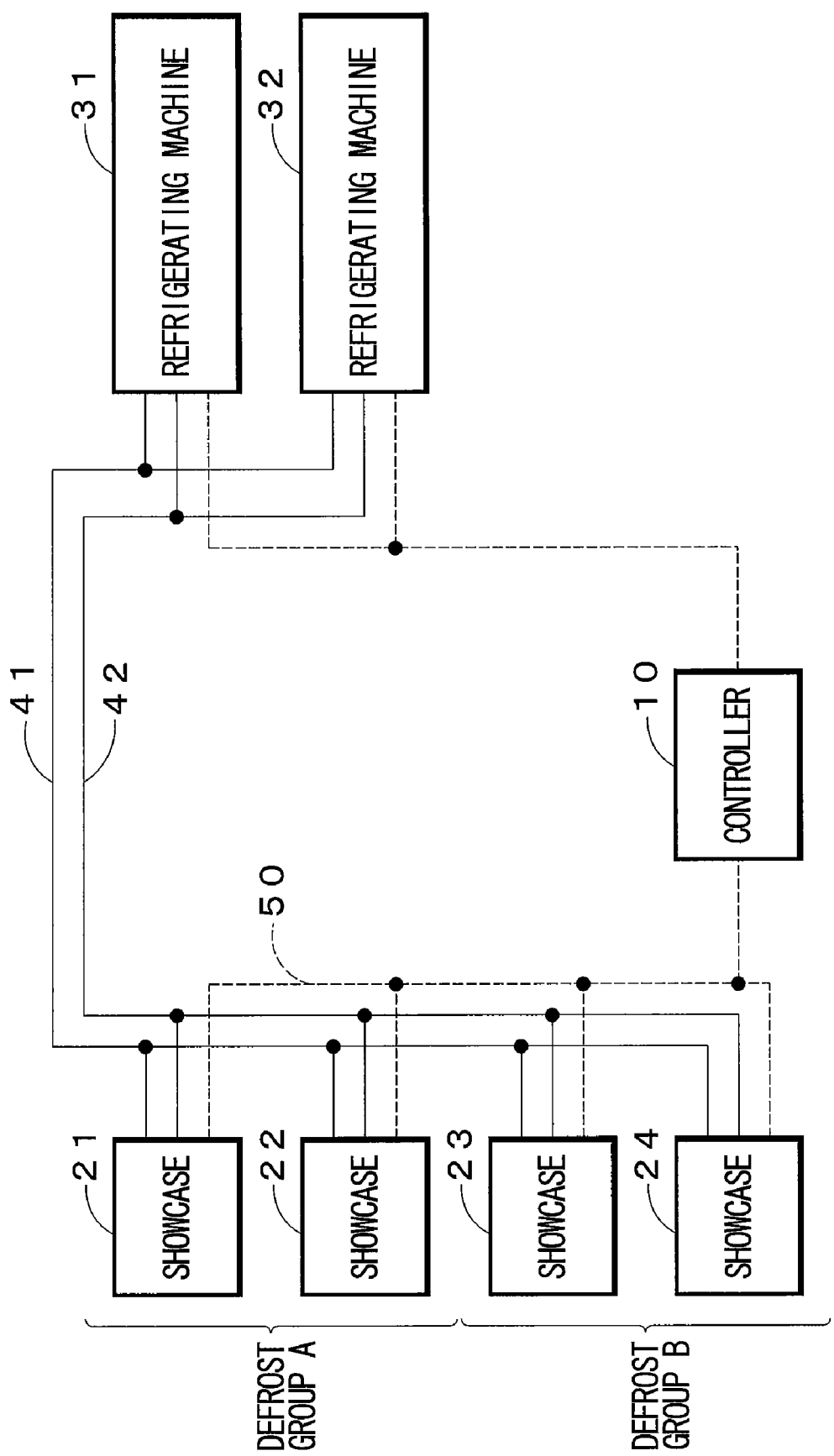
FIG. 1 is a diagram showing the construction of a refrigerating system according to an embodiment of the present invention.

FIG. 1 is a diagram showing an example of the construction of an embodiment of the present invention. As shown in FIG. 1, a refrigerating system according to the embodiment is disposed in a store such as a supermarket, a convenience store or the like to keep goods cold or freeze goods. The refrigerating system contains a controller 10 for controlling the overall operation of the refrigerating system, one or more showcases (in this embodiment, four showcases 21 to 24) in which goods are kept in cold storage or frozen, one or more refrigerating machines (in this embodiment, two refrigerating machines 31, 32), one or more refrigerant pipes (in this embodiment, two refrigerant pipes 41, 42) through which the showcases and the refrigerating machines are connected to one another, and a communication line 50 through which data communications are executed among the showcases 21 to 24, the refrigerating machines 31 and 32 and the controller 10. In the present invention, the numbers of the showcases and the refrigerating machines are not limited to the following embodiment, and any number may be adopted according to the situation.

Here, as described later, the controller 10 comprises a general-purpose computer such as a personal computer or the like, and controls the showcases 21 to 24 and the refrigerating machines 31 and 32. The showcases 21 to 24 are disposed in a store such a supermarket, a convenience store or the like, and goods are placed on show in these showcases. The showcases 21 to 24 are connected to each of the refrigerant pipes 41, 42 in parallel. Liquid-phase refrigerant is taken from the refrigerating machines 31, 32 through the refrigerant pipe 41 into each showcase, evaporated in a cooling device (described later) provided to the showcase and heat-exchanged with air in the showcase, thereby reducing the temperature of the inside of the showcase. Gas-phase refrigerant vaporized in the cooling device is returned to the refrigerating machines 31, 32 through the refrigerant pipe 42. The showcases 21 to 24 are connected to the controller 10 through the communication line 50, and communicate information with the controller 10.

Each of the refrigerating machines 31 and 32 has a compressor, a heat-exchanger, condenser, etc. as described later. The gas-phase refrigerant evaporated in the showcases 21 to 24 is withdrawn through the refrigerant pipe 42 into each refrigerating machine, compressed in the compressor and then condensed in the condenser to be changed to liquid-phase refrigerant again. The liquid-phase refrigerant concerned is supplied through the refrigerant pipe 41 to the showcases 21 to 24. Furthermore, the refrigerating machines 31 and 32 are connected to the controller 10 through the communication line 50, and receives/transmits information from/to the controller 10 through the communication line 50.

Figure 2:
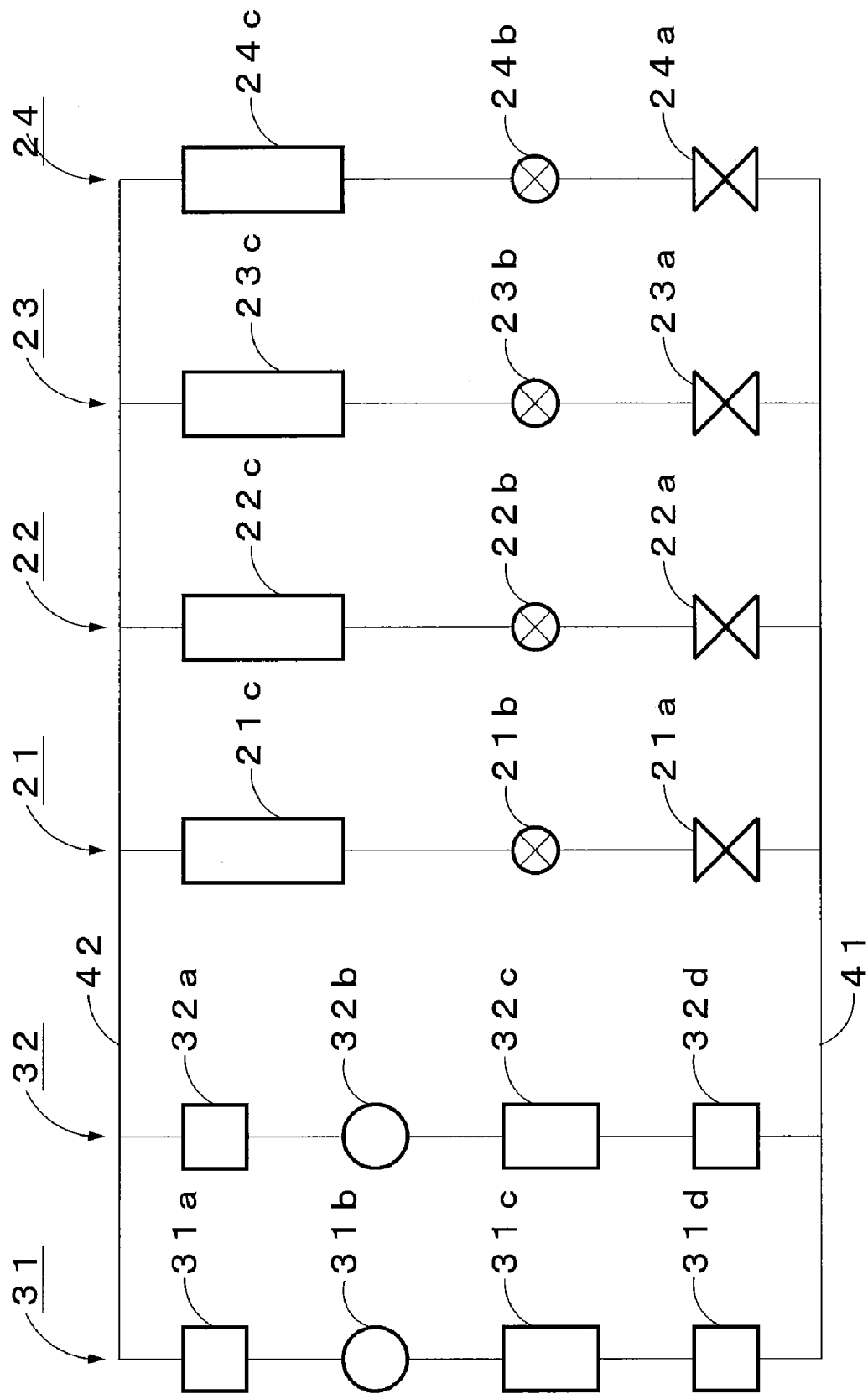
FIG. 2 is a diagram showing a refrigerant circuit of the refrigerating system shown in FIG. 1.

FIG. 2 shows the refrigerant circuit comprising the showcases 21 to 24 and the refrigerating machines 31 and 32 shown in FIG. 1. As shown in FIG. 2, the refrigerating machines 31 and 32 and the showcases 21 to 24 are connected to the refrigerant pipes 41, 42 in parallel. The refrigerant circuit of the refrigerating machine 31 includes an accumulator 31a, a compressor 31b, a condenser 31c and a receiver 31d. Here, the accumulator 31a executes gas-liquid separation on the gas-phase refrigerant supplied from the showcases 21 to 24, and supplies only the gas-phase refrigerant to the compressor 31b. The compressor 31b is driven by a motor (not shown) to compress the gas-phase refrigerant supplied from the accumulator 31a, and supplies the compressed refrigerant as high-temperature and high-pressure refrigerant to the condenser 31c. The condenser 31c condenses the gas-phase refrigerant supplied from the compressor 31b by heat radiation, and supplies the condensed refrigerant as liquid-phase refrigerant to the receiver 31d. The receiver 31d temporarily stocks the liquid-phase refrigerant supplied from the condenser 31c, and then supplies the liquid-phase refrigerant through the refrigerant pipe 41 to the showcases 21 to 24. The refrigerating machine 32 has the same construction as the refrigerating machine 31, and thus the description thereof is omitted.

The showcase 21 has an electromagnetic valve 21a, an expansion valve 21b and a cooling device 21c. Here, the electromagnetic valve 21a is a valve which is turned on or off to allow or prohibit flow of liquid-phase refrigerant into the showcase 21. The expansion valve 21b is a valve for expanding and vaporizing the liquid-phase refrigerant supplied through the electromagnetic valve 21a. The cooling device 21c is supplied with refrigerant expanded by the expansion valve 21b, and the expanded refrigerant is heat-exchanged with air in the showcase. Through this heat-exchange, the refrigerant is vaporized while absorbing vaporization heat from the air. Therefore, the temperature in the showcase is reduced to a set temperature. Each of the showcases 22 to 24 has the same construction as the showcase 21, and thus the description thereof is omitted. In the example of FIG. 2, the electromagnetic valves 21a to 24a are provided to the showcases 21 to 24, respectively. However, only one electromagnetic valve may be provided so that the refrigerant pipe 41 is connected to the inlet side of the electromagnetic valve and the expansion valves 21b to 24b are connected to the outlet side of the electromagnetic valve.

Figure 3:
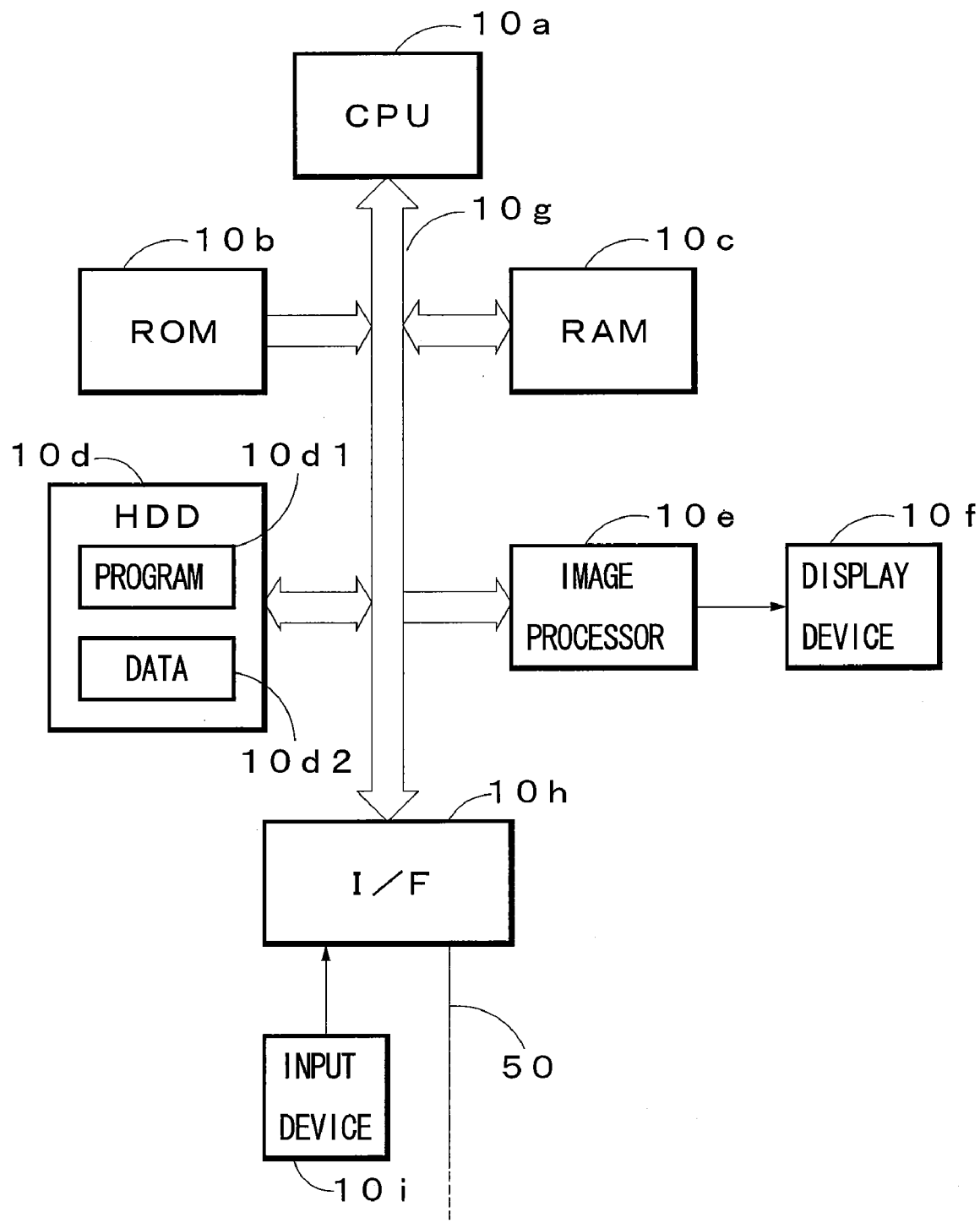
FIG. 3 is a diagram showing an example of the detailed construction of a controller shown in FIG. 1.

FIG. 3 is a block diagram showing an example of the electrical construction of the controller 10 shown in FIG. 1.

As shown in FIG. 3, the controller 10 has CPU (Central Processing Unit) 10a, ROM (Read Only Memory) 10b, RAM (Random Access Memory) 10c, HDD (Hard Disk Drive0 10d, an image processor 10e, a display device 10f, a bus 10g, I/F (Interface) 10h and an input device 10i. Here, CPU 10a executes various kinds of operation processing in accordance with programs stored in ROM 10b and HDD 100d, and also controls the showcases 21 to 24 and the refrigerating machines 31 and 32. ROM 10b stores a basic program to be executed by CPU 10a. RAM 10c is used as a work area when CPU 10a executes the programs. HDD 10d is a storage device for reading/writing information from/into a hard disk, and a program 10d1 and data 10d2 are stored in HDD 10d in the example of FIG. 3. The program 10d1 has OS and a program in which the procedure for executing processing described later is described. The data 10d2 has information to be referred to in processing described later. The image processor 10e executes drawing processing on the basis of a drawing instruction supplied from CPU 10a, converts an obtained image to a video signal and supplies the video signal to the display device 10f. For example, the display device 10f comprises LCD (Liquid Crystal Display) or the like, and displays a video signal supplied from the image processor 10e on a display unit. CPU 10a, Rom 10b, RAM 10c, HDD 10d, the image processor 10e and I/F 10h are mutually connected to one another through a bus 10g, and information can be communicated among them. I/F 10h are connected to the showcases 21 to 24 and the refrigerating machines 31 and 32 through the communication line 50, and executes conversion of the protocol, etc. when information are transmitted/received to/from them. Furthermore, an input device 10i is connected to I/F 10h, and when a manager operates the input device 10i, information output from the input device 10i is supplied through I/F 10h to CPU 10.

Next, the operation of this embodiment will be described.

When installation of the controller 10, the showcases 21 to 24 and the refrigerating machines 31 and 32 into a store has been completed, a system manager (or a person in charge for the installation) operates the input device 10i of the controller 10 to set the inside temperature of each of the showcases 21 to 24 in accordance with goods to be put on show, and also executes settings concerning a defrost operation of the showcases 21 to 24. Specifically, the setting of the inside temperature is executed in accordance with the types of goods (for example, meats, fishes, dairy products, etc. to be put on show in each showcase.

Furthermore, with respect to the defrost operation, grouping when the defrost operation is executed is set. In the example of FIG. 1, the showcases 21 and 22 are set as belonging to a defrost group A, and the showcases 23 and 24 are set as belonging to a defrost group B. For example, the grouping is executed so that showcases arranged to be adjacent to each other belong to the same group. Accordingly, air which is warmed through the defrost operation in some showcase can be prevented from flowing into other adjacent showcases and thus increasing the inside temperature of the adjacent showcases concerned.

Still furthermore, the manager operates the input device 10i of the controller 10 to input a time at which the defrost operation of each defrost group is started (hereinafter referred to as "defrost operation start time"). As a result, the input defrost operation start time is supplied to the showcases 21 to 24 through the communication line 50, and a control unit (not shown) which is provided to each of the showcases 21 to 24 and controls the overall operation (containing the defrost operation) of the corresponding showcase obtains and stores the defrost operation start time concerned. When the group to be defrosted and the defrost operation start time are set as described above, each of the showcases 21 to 24 compares a time notified from a timer (not shown) with the stored defrost operation start time, and if these times are coincident with each other, the processing shown in FIG. 4 is executed.

Figure 4:
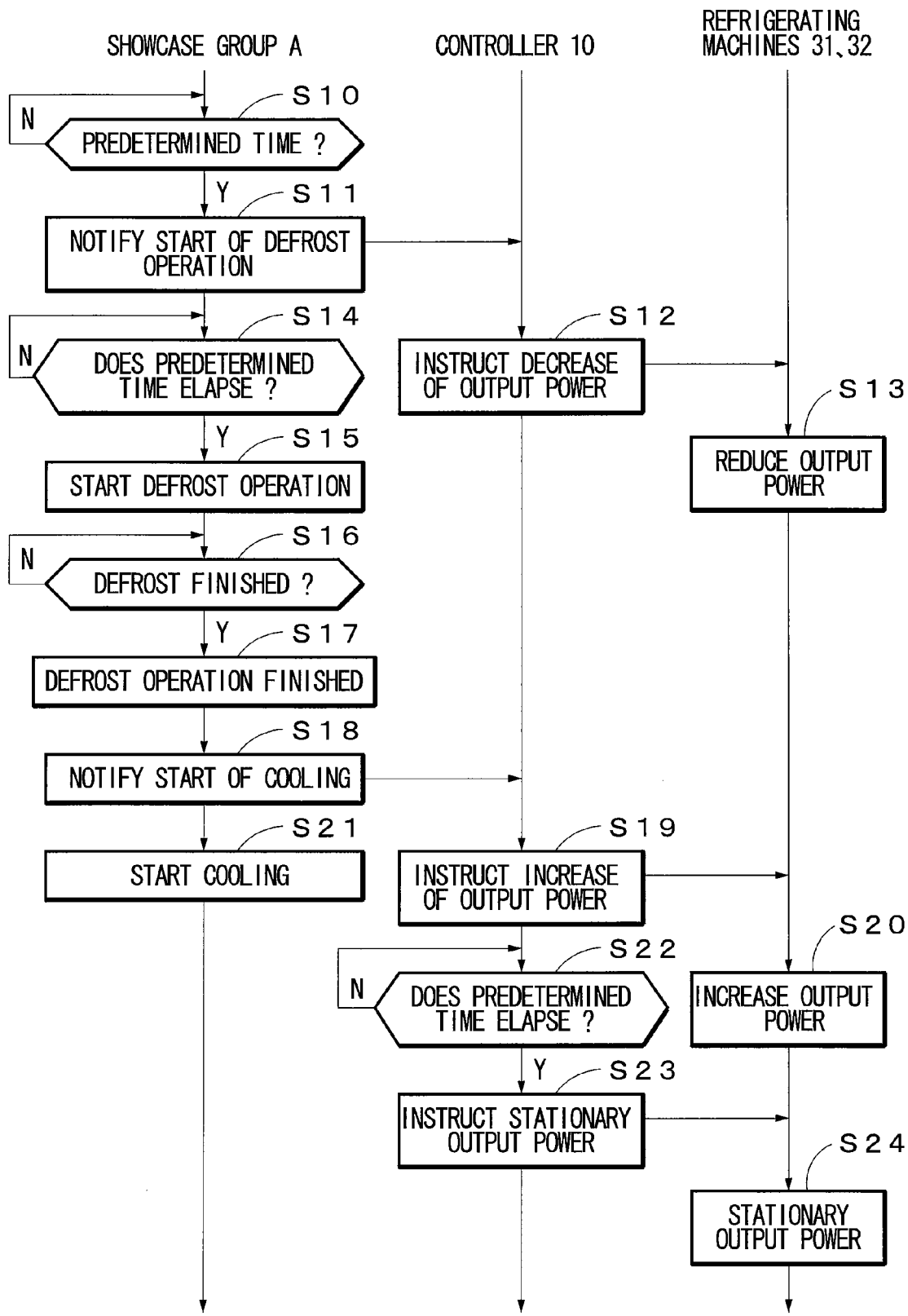
FIG. 4 is a flowchart showing the operation of the refrigerating system shown in FIG. 1.

FIG. 4 shows an example of the processing executed in the showcases 21 and 22, the controller 10 and the refrigerating machines 31 and 32 when the defrost operation is executed in the defrost group A. when this processing is started, CPU of each of the showcases 21 and 22 belonging to the defrost group A determines in step S10 whether the defrost operation start time set in the controller 10 has come, and if the defrost operation start time has come (step S10: Yes), the processing goes to step S11. If not so (step S10; No), the same processing is repeated until the defrost operation start time has come. The timers of the showcases 21 and 22 are synchronized with each other, and the defrost operation start time is set to the same value in the showcases of the same group. Accordingly, when the defrost operation start time has come, "Yes" is determined in step S10, and the processing goes to step S11.

In step S11, the showcases 21 and 22 notify the start of the defrost operation to the controller 10 through the communication line 50. That is, each of the control units (not shown) of the showcases 21 and 22 transmits a notification indicating the start of the defrosting operation through the communication line 50 to the controller 10. As a result, in the controller 10, CPU 10a receives the defrost operation starting notification from the respective control units through I/F 10h, and the processing goes to step S12, so that CPU 10a instructs the refrigerating machines 31 and 32 to reduce the output power thereof. More specifically, CPU 10a instructs the refrigerating machines 31 and 32 so that the total decrease amount of the output power of the refrigerating machines 31 and 32 corresponds to the decrease amount of output power caused by the defrost operation executed in the defrost group A. Specifically, as shown in FIG. 5, when the total output power of the refrigerating machines 31 and 32 at To (defrost operation start time) is equal to P2, the total output power p2 is reduced by ΔP and set to P1. The specific value of ΔP may be determined as follows. That is, the defrosting group A is made to actually execute the defrost operation, and the output power which is actually reduced through this defrost operation is measured and ΔP is set to this measurement value. With respect to the defrost group b, the set temperature, the machine type, the type and amount of goods to be put on show, etc. are different from the defrost group A, and thus ΔP is required to be determined separately.

In the refrigerating machines 31, 32 receiving the instruction of reducing the output power from the controller 10, the control of reducing the total output power by only ΔP is executed. For example, when a motor for driving the compressor 31b 932b) is driven with power supplied from an inverter, the rotational number of the motor is reduced by lowering the frequency of the inverter to reduce the output power. Furthermore, when the motor has no inverter, both or any one of the refrigerating machines 31 and 32 may be intermittently stopped to reduce the average output power. By executing the control as described above, the total output power of the refrigerating machines 31 and 32 is reduced by ΔP and set to P1 at the time T1.

At this time, in the showcases 21 and 22, the processing of step S14 is executed, and it is determined whether a predetermined time elapses from the notification of the start of the defrost operation in step S11. If the predetermined time elapses (step S14; Yes), the processing goes to step S15. In the other cases (step S14; No), the same processing is repeated until the predetermined time elapses. The "predetermined time" in step S14 is different every system. Accordingly, an optimum value is determined every system and the determined optimum value is set as the "predetermined time". As a method of determining the optimum value, after the output power of the refrigerating machines 31, 32 is lowered, a time at which temperature increase at the inlets of the refrigerant machines 31, 32 at the start time of the defrost operation is lowest is determined. When the predetermined time is determined, it is also required to pay attention to a delay time caused by the communication from the notification time of the start of the defrost operation till the arrival time of the output power reducing indication at the refrigerating machines 31, 32.

When the defrost operation is started in step S15 in the showcases 21 and 22 of the showcase group A, the expansion valves 21b and 22b or the electromagnetic valves 21a and 22a are closed to interrupt the flow-in of refrigerant into the cooling devices 21c and 22c, and also air is blown to the cooling devices 21c, 22c to start an operation of removing frost adhering to the cooling devices 21c and 22c. When the defrosting operation is started as described above, no refrigerant is circulated through the showcases 21 and 22, and thus it is required to reduce the output power of the refrigerating machines 31 and 32. According to this embodiment, the total output power of the refrigerating machines 31 and 32 is reduced prior to the start of the defrost operation, and thus needless refrigerant can be prevented from being supplied to the showcases 21 to 24, and thus the output power of the refrigerating machines 31 and 32 can be prevented from being needlessly wasted.

In step S16, the showcases 21 and 22 determine whether the defrost operation is finished or not. If it is finished (step S16; Yes), the processing goes to step S17. In the other cases (step S16; No), the same processing is repeated until the defrost is finished. More specifically, in the showcases 21 and 22, the temperature of each of the cooling devices 21c, 22c is detected by a sensor, and when the detected temperature is equal to a predetermined temperature or more, it is determined that the defrost is finished, and the processing goes to step S17. The end of the defrost operation is determined every showcase because the set temperature is different or the amount (number) of goods which are put on show in each showcase is different between the showcases.

In step S17, the showcase which determines the end of the defrost finishes the defrost operation. In step S18, the showcase in which the defrost is finished notifies the controller 10 of the end of the defrost operation and the start of a cooling operation of reducing the inside temperature of the showcase to a set temperature. As a result, in the controller 10, CPU 10a receives the cooling start notification through I/F 10h. CPU 10a recognizes the reception of the cooling start notification, and transmits an output power increasing instruction to the refrigerating machines 31 and 32 through I/F 10h and the communication line 50 so that the output power of the refrigerating machines 31 and 32 is increased in step S19. As a result, in step S20, the refrigerating machines 31, 32 increases the frequency of the inverter and thus increases the rotational numbers of the compressors 31b and 32b. As a result, the amounts of the liquid-phase refrigerant discharged from the refrigerating machines 31 and 32 increase. The increase amounts are set so as to maximize the output power of the refrigerating machines 31 and 32. The inside temperature of each showcase is increased by the defrost operation, and thus it is necessary to rapidly reduce the inside temperature of each showcase.

The above operation will be more specifically described.

As shown in FIG. 5, when defrost is finished at a time T3, the total output power of the refrigerating machines 31, 32 reaches the maximum output power P3 at a time T4. In step S21, the showcase in which defrost is finished starts to cool the inside of the showcase concerned. That is, the showcase in which defrost is finished executes the processing of setting the expansion valve or the electromagnetic valve to an open state so that refrigerant is led to the cooling device. As a result, re-cooling of the inside of the showcase is started in the showcase in which defrost has been completed.

In step S22, CPU 10a determines whether a predetermined time elapses from the instruction of increasing the output power. If the predetermined time elapses (step S22; Yes), the processing goes to step S22, and if not so (step S22; No), the same processing is repeated until the predetermined time elapses. The "predetermined time" in step S22 may be set to a time required till the temperature of each of the showcases 21, 22 is returned to the set temperature from the start of cooling. As described above, the "predetermined time" may be calculated by actual measurement.

In step S23, CPU 10a instructs the refrigerating machines 31, 32 to output the stationary output power. That is, CPU 10a transmits a control signal to each of the refrigerating machines 31, 32 through I/F 10h and the communication line 50 to instruct the refrigerating machines 31, 32 so that the output power thereof is returned to the stationary output power. As a result, in step S24, the frequencies of the refrigerating machines 31, 32 are returned to the frequencies under the stationary state, and thus the total output power of the refrigerating machines 31, 32 is returned to P2 which is the total output power under the stationary state. Here, the stationary output power means the output power of the refrigerating machines 31, 32 when the refrigerating system is under the stationary state. The stationary state varies in accordance with the environment in which the showcases 21 to 24 are disposed, the type and number of goods put on show in each showcase, the set temperature, etc., and thus it is not set to a fixed state at all times. Accordingly, an output value under a state before the defrost operation is started may be utilized as a stationary state value.

In the foregoing description, the defrost group A executes the defrost operation. However, when the defrost group B executes the defrost operation, the same processing is executed as in the case of the defrost group A.

As described above, according to the embodiment of the present invention, the controller 10 instructs the refrigerating machines 31 and 32 to reduce the output power thereof when some showcase executes the defrost operation, and the refrigerating machines 31 and 32 reduce the output power in response to the instruction from the controller 10. Accordingly, before the defrost operation is executed or substantially in synchronization with the defrost operation, the output power of each of the refrigerating machines 31 and 32 (or the total output power of the refrigerating machines 31 and 32) can be reduced. Therefore, refrigerant can be prevented from being excessively supplied and thus the operation efficiency can be enhanced.

Furthermore, according to this embodiment, when the defrost operation is finished, the output power of each of the refrigerating machines 31 and 32 is increased. Therefore, the temperature of the showcase in which the defrost operation is finished can be rapidly reduced. Accordingly, the temperature of goods put on show in the showcase can be prevented from increasing. Furthermore, when the output power is increased and then the temperature of the showcase is reduced till the vicinity of the set temperature, the refrigerating machines 31 and 32 returns to the stationary operation. Accordingly, when the temperature of the inside of the showcase decreases till the set temperature, the power loss can be reduced by reducing the output power.

Still furthermore, according to this embodiment, the decrease of the output power of each refrigerating machine 31, 32 (or the decrease of the total output power of the refrigerating machines 31 and 32) is measured and stored in HDD 10$d$ every defrost group in advance, and when the defrost operation is started, the output power of each of the refrigerating machines 31, 32 (the total output power of the refrigerating machines 31 and 32) is reduced on the basis of the information stored in HDD 10$d$. Therefore, when the defrost operation is executed, the output power of the refrigerating machine(s) can be rapidly reduced to a proper value.

(B) Description of Modification

The above embodiment is an example of the present invention, and any modification and any application may be performed without departing from the subject matter of the preset invention.

For example, in the above embodiment, the refrigerating system contains the four showcases and the two refrigerating machines. However, the number of the showcases may be set to three or less or five or more, and the number of the refrigerating machines may be set to one or three or more. Each defrost group comprises two showcases, and thus two defrost groups are provided. However, the number of showcases constituting each defrost group may be set to one or three or more, and thus one or three or more defrost groups may be provided. Furthermore, the respective defrost groups may have different numbers of showcases.

In the above embodiment, each of the refrigerating machines 31 and 32 controls the frequency of the inverter to change the output power. However, when the refrigerating machine has no inverter, a predetermined refrigerating machine out of plural refrigerating machines may be stopped or intermittently operated to change the total output of the refrigerating machines.

Furthermore, in the above embodiment, when the controller 10 receives the defrost operation start notification from the showcases 21 to 24, the control instructs the reduction of the output power. Alternatively, the defrost operation start time of each defrost group may be stored in HDD 10$d$ of the controller 10 in advance. In this case, the controller 10 compares the stored defrost operation start time with the present time, and detects the start of the defrost operation to instruct the reduction of the output power. In this embodiment, if the controller instructs the reduction of the output power at a time which is earlier than the defrost operation start time by a predetermined time, it would be unnecessary for the showcase side to determine whether the predetermined time elapses or not (step S14) Furthermore, the controller 10 may adjust the predetermined time on the basis of the past control, whereby the predetermined time is optimized and the operation efficiency can be further enhanced.

In the above embodiment, the controller 10 instructs the output power amount ($\Delta P$ in FIG. 5) to be reduced. Alternatively, the controller 10 may notify only information for specifying the defrost group in which the defrost operation is started. In this case, the refrigerating machines reduce the output power on the basis of the notified information for specifying the defrost group. For example, when it is notified from the controller 10 that the defrost group A starts the defrost operation, the refrigerating machines 31, 32 reduce the total output power by only $\Delta PA$. When it is notified from the controller 10 that the defrost group B starts the defrost operation, the refrigerating machines 31, 32 reduces the total output power by only $\Delta PB$.

Furthermore, in the above embodiment, when the defrost operation is finished in one showcase, the controller 10 increases the output power of each of the refrigerating machines 31, 32 (or the total output power of the refrigerating machines 31, 32) to the maximum level. However, the output power (total output power) may be stepwise increased in accordance with the number or type of showcases in which the defrost operation is finished. For example, when the showcase 21 finishes the defrost operation during the defrost operation of the defrost group A, the output power is increased by only the amount corresponding to the showcase 21, and when the showcase 22 finishes the defrost operation, the output power is increased by only the amount corresponding to the showcase 22. According to this method, the output power can be increased by only an optimum amount in accordance with the type of the showcase, the set temperature, the amount (number) of goods put on show in the showcase, etc., and thus the operation efficiency can be enhanced.

Furthermore, in the above embodiment, when the operation is returned to the stationary operation after the output power is increased, it is determined on the basis of the judgment as to whether a predetermined time elapses or not in step S22. However, the stationary operation may be restored on the basis of the inside temperature of the showcase in which the defrost operation is finished or the like. Specifically, when the inside temperature of the showcase 21 is first restored to the set temperature, the output power is reduced by the corresponding amount, and then when the inside temperature of the showcase 22 is restored to the set temperature, the output power may be reduced by the corresponding amount.

In the above-described embodiment, when the defrost operation is started, each of the refrigerating machines 31 and 32 reduces the output power thereof so that the total output power of the refrigerating machines 31 and 32 is reduced by a predetermined amount. However, only any one of the refrigerating machines 31 and 32 may reduce the output power thereof so that the total output power of the refrigerating machines 31 and 32 is reduced by a predetermined amount.

As described above, according to the present invention, on the basis of a notification indicating the start of the defrost operation from each showcase or from a timer, the controller 10 instructs the refrigerating machines to reduce the total output power thereof. In response to the instruction from the controller 10, the refrigerating machines 31, 32 reduces the output power thereof by themselves. Accordingly, even when each of the showcases and the refrigerating machines is exchanged by a new one or another type one, or even when a new showcase and/or a new refrigerating machine is added, the same effect as described above can be obtained by merely interposing the controller 10 between the showcase and the refrigerating machine insofar as each of the showcases and the refrigerating machines has the function as shown in FIG. 4.

What is claimed is:

1. A controller for a refrigerating system including at least one refrigerating machine and a plurality of showcases each of which has a control unit and is connected to the at least one refrigerating machine through a refrigerant pipe, the controller being connected to each of the at least one refrigerating machine and the plurality of showcases through a communication line to communicate information on a defrosting operation, comprising:

a defrost showcase detecting unit for detecting, as defrost operation indicating information, a notification that is individually transmitted from the control unit of each of the plurality of showcases and identifies the showcase that is about to execute the defrost operation, said controller determining a decrease amount of output power of the at least one refrigerating machine based on the notification;

an output-power decrease instructing unit for instructing the at least one refrigerating machine to reduce the output power of the at least one refrigerating machine to a value lower than stationary output power of the at least one refrigerating machine on the basis of the decrease amount of the output power determined by the defrost showcase detecting unit before the showcase concerned starts execution of the defrost operation; and an output-power increase instruction unit for instructing the at least one refrigerating machine to increase the output power of the at least one refrigerating machine to a value higher than the stationary output power of the at least one refrigerating machine when the defrost operation is finished.

2. The controller according to claim 1, further comprising a storage unit for storing a defrost operation start time of the showcase concerned, a comparing unit for comparing the defrost operation start time stored in the storage unit with present time, and a step of instructing the at least one refrigerating machine to decrease the output power thereof when the defrost operation start time is coincident with the present time.

3. The controller according to claim 1, wherein the output-power increase instruction unit reduces the output power of the at least one refrigerating machine to the stationary state when the inside temperature of the showcase concerned is restored to a set temperature after the output power of the at least one refrigerating machine is increased.

4. The controller according to claim 1, further comprising a storage unit for pre-storing a decrease amount of the output power of the at least one refrigerating machine which is measured for every refrigerating machine, and the output-power decrease instructing unit instructs the at least one refrigerating machine to reduce the output power thereof on the basis of the decrease amount of the output power pre-stored in the storage unit when the defrost operation is started.

5. The controller according to claim 1, wherein when plural showcases start the defrost operation in synchronization with one another, the output-power increase instructing unit instructs the at least one refrigerating machine to stepwise increase the output power thereof in accordance with the number of showcases in which the defrosting operation has been finished.

6. A control method for a refrigerating system including at least one refrigerating machine and a plurality of showcases each of which has a control unit and is connected to the at least one refrigerating machine through a refrigerant pipe, the controller being connected to each of the at least one refrigerating machine and the plurality of showcases through a communication line to communicate information on a defrosting operation, comprising:

a defrost showcase detecting step for detecting, as defrost operation indicating information, a notification that is individually transmitted from the control unit of each of the plurality of showcases and identifies which showcase is about to execute the defrost operation, and for determining a decrease amount of output power of the at least one refrigerating machine based on the notification;

an output-power decrease instructing step for instructing the at least one refrigerating machine to a value lower than stationary output power of the at least one refrigerating machine on the basis of the decrease amount of the output power determined by the defrost showcase detecting step before the showcase concerned starts execution of the defrost operation; and an output-power increase instruction step for instructing the at least one refrigerating machine to increase the output power of the at least one refrigerating machine to a value higher than the stationary output power of the at least one refrigerating machine when the defrost operation is finished.

7. The control method according to claim 6, further comprising a storage step for storing a defrost operation start time of the showcase concerned, a comparing step for comparing the defrost operation start time stored in the storage unit with present time and an instructing step of instructing the at least one refrigerating machine to increase the output power thereof when the defrost operation start time is coincident with the present time.

* * * * *